United States Patent [19]

Hayashi et al.

[11] Patent Number: 4,630,129
[45] Date of Patent: Dec. 16, 1986

[54] IMAGE OUTPUT APPARATUS FOR PRINTING AN IMAGE AND COMPARING IMAGE WITH ORIGINAL

[75] Inventors: Kiyoshi Hayashi; Yoshihiro Kawahara, both of Osaka, Japan

[73] Assignee: Mita Industrial Co., Ltd., Osaka, Japan

[21] Appl. No.: 644,678

[22] Filed: Aug. 27, 1984

[30] Foreign Application Priority Data

Aug. 27, 1983 [JP] Japan ................. 58-158886
Aug. 27, 1983 [JP] Japan ................. 58-158887
Aug. 27, 1983 [JP] Japan ................. 58-158888

[51] Int. Cl.⁴ ................. H04N 1/21; H04N 1/23; G01D 15/06
[52] U.S. Cl. ................. 358/296; 358/300; 346/160
[58] Field of Search ................. 358/296, 300–302; 346/76 PH, 153.1, 160; 400/120

[56] References Cited

U.S. PATENT DOCUMENTS 3,465,096  9/1969  Artzt .
4,320,962  3/1982  Takahashi et al. ................. 355/14 C
4,358,794  11/1982  Kurakami et al. .
4,364,023  12/1982  Isshiki et al. .
4,365,234  12/1982  Henrichon, Jr. .
4,414,579  11/1983  Dattilo et al. ................. 358/300 X

FOREIGN PATENT DOCUMENTS 3312372  10/1983  Fed. Rep. of Germany .
3318303  11/1983  Fed. Rep. of Germany .
58-85668  5/1983  Japan ................. 358/296

OTHER PUBLICATIONS

Long et al, "Print Current Adjustment for Electrothermal Printers", IBM Tech Disclosure, vol. 25, No. 4, pp. 1982-1983, Sep. '82.

Primary Examiner—E. A. Goldberg
Assistant Examiner—Patrick W. Foster
Attorney, Agent, or Firm—Wenderoth, Lind & Ponack

[57] ABSTRACT

An image output apparatus prints an image of an original document and compares the printed image with the original document. Information representative of the original document operates a printing unit for printing an image of the original on a sheet of paper supplied from a paper feeding device. An image sensor senses the image on the printed paper and provides information representative thereof. The information from the image sensor is compared with the information supplied from the original document.

3 Claims, 4 Drawing Figures

IMAGE OUTPUT APPARATUS FOR PRINTING AN IMAGE AND COMPARING IMAGE WITH ORIGINAL

BACKGROUND OF THE INVENTION

1. Field of the Invention

This invention relates to an image output apparatus which is adapted to receive information input based on a manuscript (original) and to print an output image of the original on paper fed from a paper feeding unit

2. Description of the Prior Art

Printer devices of computers and of word processors as well as output devices of facsimile machines and of electronic mail machines are sometimes operated without an attendant and accordingly are provided with self-check mechanisms for appropriately dealing with image abnormalities which possibly occur.

However, conventional methods of dealing with image abnormalities are based on a concept that, opposed to a check of the image itself as an output, normal performance of all composing units without trouble assures no problems with or abnormalities of the images. As a result, severe deterioration of image quality sometimes occurs due to inadequate manufacture or storage of the transfer sheet, the thermographic paper, the ink ribbon, and/or the ink sheet, depending on the particular medium employed. In such a case, in devices wherein the content of a memory is successively cleared with the completion of each image printing operation, reprinting and reproduction of important data is not possible.

An image output apparatus, such as a facsimile machine or an electronic mail machine, which transmits information from a transmitting machine at one location to a receiving machine at another location to obtain output images cannot check the output images with the manuscript due to the fact that the manuscript is not located at the receiving machine, whereby an improper output image, if it occurs, might not be detected.

Also, in a case where a copying machine with a sorter copies different manuscripts in succession, or a document feeder automatically transmits a number of manuscripts, it has been difficult in the past to check the output images one by one.

SUMMARY OF THE INVENTION

A main object of the invention is to provide an apparatus operable to directly check output images themselves to discriminate whether the images are normal or abnormal, thereby to obtain images of high quality.

Another object of the invention is to provide an apparatus operable to automatically check the quality of an output image, thereby to enable an image quality adjustment.

In order to attain the above objects, the present invention provides an image output apparatus including an image printing unit receiving manuscript information input obtained on the basis of a manuscript, thereby to print output images on paper fed from a paper feeding device, and an image reading sensor reading the output images, whereby the output image information obtained by such image reading sensor is used to check the output images.

BRIEF DESCRIPTION OF THE DRAWINGS

Other objects and aspects of the invention will become apparent from the following detailed description of embodiments thereof, with reference to the accompanying drawings, wherein.

DESCRIPTION OF THE PREFERRED EMBODIMENTS

Figure 1:
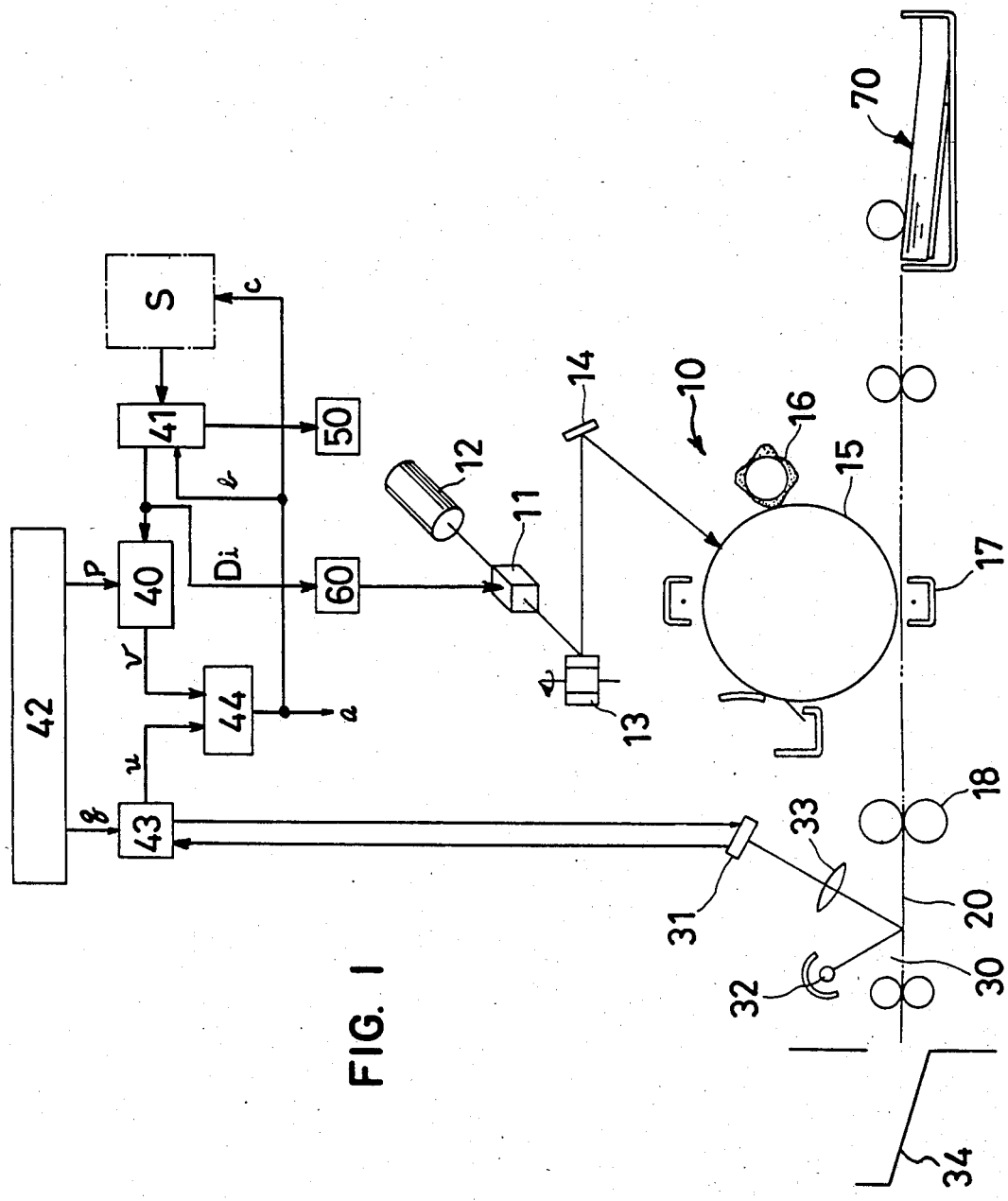
FIG. 1 is a block diagram of a first embodiment of an output apparatus the invention.

FIG. 1 is a block diagram of a first embodiment of an image output apparatus of the invention which is applied to a laser printer. In FIG. 1, reference numeral 10 designates a printer (an example of an image formation apparatus). Coded print data $D_i$ transmitted from a page memory 40, to be described below, is input into a modulator 11 through a character generator 60. Laser light from a laser tube 12 is modulated by data $D_i$ and this modulated light output is transmitted from the modulator 11 and forms electrostatic latent images on a drum-like photoreceptor 15 through a revolving mirror 13 and a reflecting mirror 14. Thus, a predetermined image output may be obtained on a paper 20, transferred from a paper feeding device 70, by a developing device 16, a transfer device 17, and fixing device 18, such arrangement not being different from ordinary laser printers.

Reference numeral 30 indicates a paper delivery device for delivering the paper 20, and located in proximity thereto is an image reading device 31 for sensing and reading output images formed on the paper 20. Image reading device 31 is composed of, for example, a charge coupled device (CCD), known in the art. A charge coupled device is a semiconductor functional device invented by Boyle et al. of Bell Telephone Research Institute, U.S.A., in 1970. In the present invention, the CCD is used as an image reading device 31. The CCD reads output images (characters and/or figures) formed on the paper 20 as an intensity of illumination and converts it into electric signals (voltage) for transmitting them to a code conversion circuit 43. Reference numerals 32, 33 and 34 indicate a light source, a lens, and a paper delivery tray, respectively.

On the input side of the page memory 40 is a switching circuit 41 through which signals of coded printed date $D_i$ transmitted from a source or machine S at a transmitting location are input into the page memory 40. For example, when the contents of a document or manuscript are to be transmitted from a transmitting office in one city to a receiving city in another city, such as by facsimile, the transmitting office is the transmitting source or machine, and the receiving office is the receiving machine or location. The page memory 40 stores up data $D_i$ in the order of address or supply. The contents (characters and/or figures) of the manuscript to be transmitted from the transmitting office to the receiving office are converted into optical signals in the facsimile machine of the transmitting office and further into electric signals which are coded as data $D_i$. For example, a picture (image), when cut lengthwise and crosswise into 500 pieces in each direction, is divided into 250,000 pieces of minute squares and each of these minute squares forms a dot or picture element. These dots are converted into digital signals in such a way that a black dot and a white dot are expressed as "1" and "0", respectively. Reference numeral 42 indicates a reading control circuit controlled by, for example, timing signals of the transfer system, control signals P and q from the control circuit being input into the page memory 40 and a code conversion circuit 43, respectively. The code conversion circuit 43 actuates the image reading device 31 in response to the control signal q and converts the read-out output signal transmitted from reading device 31 into coded signals for outputting a read-out output code signal u. Reference character v represents a character code signal read from the page memory 40 in response to the control signal P. Reference numeral 44 indicates a comparator circuit to which the read-out code signal u and character code signal v are input, numeral 50 denoting another memory circuit or another printer device.

For example, USASCII (United States of America Standard Code of Information Interchange) is used as the above signals u and v.

The operation following transfer of signals of print data $D_i$ from the transmitting source or machine S now will be described.

Print data $D_i$ are stored in the page memory 40 in the order of address and the print data $D_i$ are transmitted in turn to the modulator 11 through the character generator 60, and are output as images on the paper 20 after being subjected to the ordinary printing process. When the paper 20 reaches a predetermined position at the paper delivery device 30, a timing signal of the transfer system is input into the reading control circuit 42, whereby control signals P and q are output from control circuit 42. The page memory 40 that has received a control signal P outputs the character code or signal v representing a foremost address stored therewithin to the comparator circuit 44.

On the other hand, the code conversion circuit 43 that has received the control signal q actuates the image reading device 31 which reads the images formed on the paper 20 located at the paper delivery device 30 and generates signals representative thereof. Circuit 43 converts such read-out signals into coded signals and inputs read-out output code or signal u into the comparator circuit 44.

The comparator circuit 44 compares the character code v with the read-out output code u and determines whether the two codes or signals are identical with each other Subsequently, images contained on one page are examined one by one in the same way as described above.

When a discrepancy between the two codes, or a discrepancy exceeding a certain allowable value, is determined by this comparison, the printing operation is stopped or a warning is given, e.g. by display of stop indication a. When stoppage of operation is impossible, a changeover instruction b is issued simultaneously with the operation stop output, thereby performing changeover control over the switching circuit 41, and while the other memory or printer 50 is caused to operate, data are stored in the other memory or output by the other printer. Along with these operations, a warning signal c is fed back to the transmitting source or machine S for stopping or re-transmitting signals of print data.

According to the present invention, output images are read by an image reading device and the read-out output codes or signals obtained from the read-out output are compared with codes or signals of print data, thereby enabling an accurate check of the quality of images printed on the paper. In contrast with conventional methods of quality testing or checking, an exact observation of whether the image quality is normal or abnormal is assured, since the present invention checks the image itself.

It is a matter of course that the present invention is effective for operation with an attendant, for feeding the paper to a sorter, for automatic sealing, or for delivery of the paper with the face thereof directed downwardly, as well as for operation at night or operation without an attendant.

Figure 2:
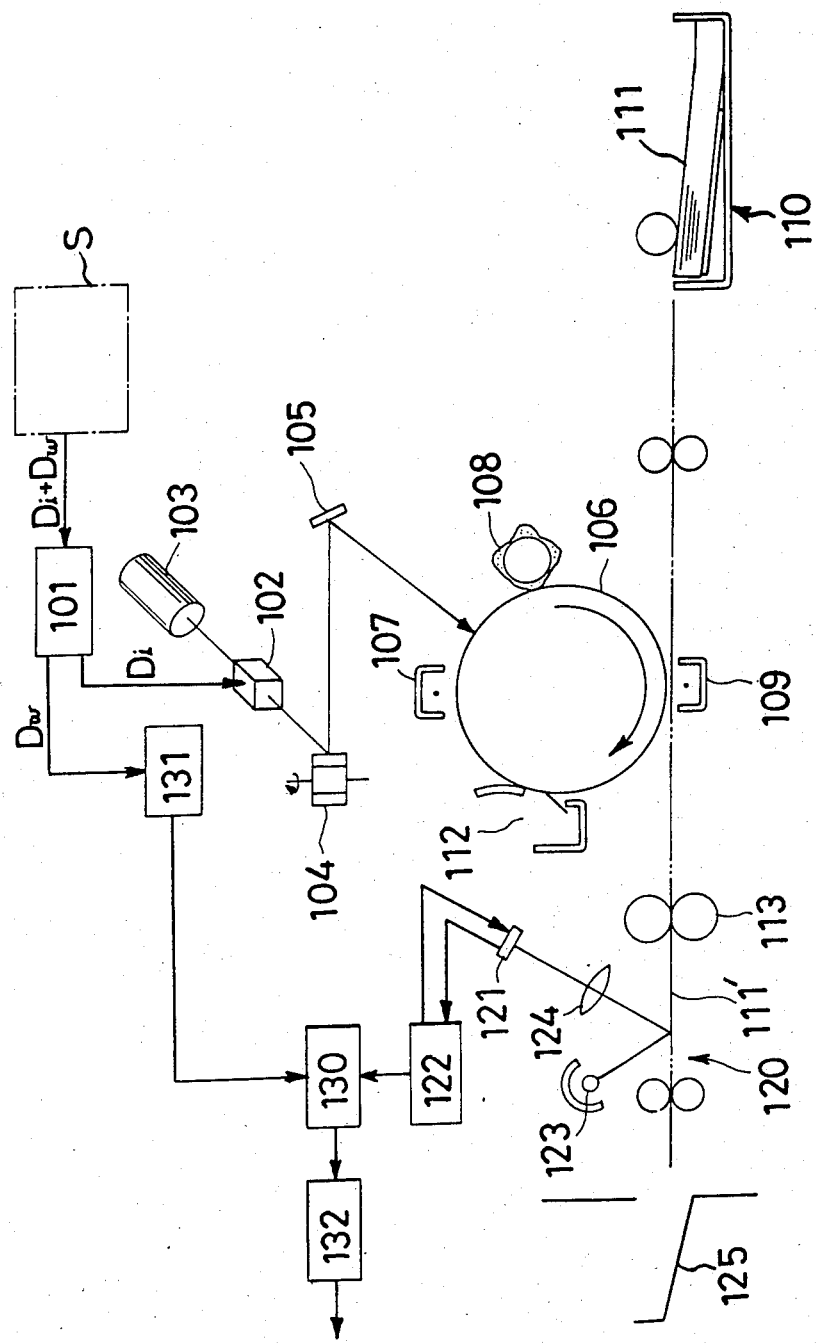
FIG. 2 is a block diagram of a second embodiment of an output apparatus of the invention.

FIG. 2 is a block diagram of a second embodiment of the invention, which similarly is employed with a laser printer. In FIG. 2, reference numeral 101 indicates a data discrimination circuit for discriminating and separating print data $D_i$ from ratio data $D_w$, which two data are input thereinto after being transmitted from transmitting source or machine S. The $D_i$ in the embodiment shown in FIG. 2 is the same as $D_i$ in the embodiment of FIG. 1. A term "ratio data $D_w$" is a concept implying a ratio of area of, for example, black parts (characters and/or figures) on one page of the original manuscript against the whole area of such page, and expressed in terms of the above mentioned dots or picture elements as follows:

$$D_w = \frac{\text{The number of black dots}}{\text{The total number of all dots (black dots + white dots)}}$$

Thus, ratio data $D_w$ is the ratio of the total area of black dots or picture elements appearing on one page to the entire area of such page of the manuscript (document). A value of $D_w$ is counted by, for example, a commercially available CCD and counter. A term "picture (image) element density" is an index to show the degree of resolving power, which is obtained by dividing the number of picture elements lying side by side on a scanning line by the length of the scanning line and is usually expressed as pels/mm. This concept is well known in the facsimile and computer printer fields. From the ratio data $D_w$ and picture element density, an accumulation value of images on the manuscript can be calculated. For instance, when characters and figures are printed on A4 size (210×297 mm) paper with a picture element density of 8×8 pels/mm as well as ratio data $D_w$ of 1/10, an accumulation value of images on the manuscript is as follows:

(8 × 8) × (210 × 297) × 1/10 = 399.168
  ↑          ↑          ↑
Picture   Area of   Ratio
element  A4 size   data
density of  sheet
A4 size
sheet
(pels/mm)

Reference numeral 102 designates a modulator which suitably modulates laser light from a laser tube 103 by means of print data $D_i$. The modulated output therefrom forms electrostatic latent images on a drum-like photoreceptor 106 through a revolving mirror 104 and a reflecting mirror 105. Numerals 107 and 108 indicate a charging device and a developing device, respectively. Reference numeral 109 indicates a transfer device to transfer toner-applied images produced on the photoreceptor 106 onto a paper 111 when the paper fed from a paper feeding device 110 synchronously with the rotation of photoreceptor 106 reaches a transfer point.

The numeral 112 denotes a cleaning device for scraping residual toner off the photoreceptor 106 after transfer. Numeral 113 indicates a fixing device by which toner-applied images transferred to the paper by transfer device 109 arefixed. The image-printed paper 111' then is fed to a paper delivery device 120. The arrangement described above is not different from that of known laser printers.

A reading sensor 121 for sensing image dots or picture elements on the image-printed paper 111' is provided near the paper delivery device 120 and is composed of, for example, a CCD. Sensor 121 is actuated by a driver 122 controlled by a timing signal of the transfer system. Reference numerals 123, 124 and 125 indicate a light source, a lens and a paper delivery tray, respectively.

Numeral 130 indicates a counter, for example, a down counter. Numeral 131 illustrates a presetting circuit to set a predetermined value in the counter 130 on the basis of image ratio data $D_w$ which is another output emitted from the data discrimination circuit 101. Numeral 132 represents a decoder to decode the output from the counter 130.

The operation conducted when data are transmitted from transmitting source or machine S now will be described.

When data consisting of print data $D_i$ and ratio data $D_w$ are transmitted from transmitting source or machine S and are input into data discrimination circuit 101 of the laser printer on the receiving machine, the data discrimination circuit 101 discriminates and separates data $D_i$ and $D_w$ for individual outputting thereof. Print data $D_i$ is subjected to the ordinary printing process and images are transferred to the paper 111, and then the printed paper 111' carrying printed images is forwarded to the paper delivery device 120.

On the other hand, ratio data $D_w$ is input into presetting circuit 131 in which an accumulation value of images on the manuscript is calculated from the ratio data and picture or image element density, and is displayed in terms of binary digits to be given as a set value to counter 130. In this case, on the assumption that an error to be allowed and an accumulation value of images on the manuscript are $\alpha$ and x, respectively, the set value is expressed as $(x+\alpha)$.

When the paper 111' reaches a position near the paper delivery device 120, the driver 122 is controlled by a timing signal emitted from the transfer system and the reading sensor 121 starts reading image dots or picture elements on paper 111', the output therefrom being given as a down clock count to the counter 130. Then, the counter starts down-counting from the set value $(x+\alpha)$ and continues the counting operation until the completion of reading of the image on paper 111'. The device CCD 121 is the same as that of CCD 31 of FIG. 1. Both CCDs read intensity of illumination and output "1" when reading a black picture element (dot) and output "0" when reading a white picture element.

When printing on the paper 111' is correct, a final value $\beta$ at the end of the down-counting operation must be equal to the error to be allowed $\alpha$. If the final value $\beta$ is not equal to the error to be allowed $\alpha$ at the end of down-counting, the state of output on paper 111' is checked by means of decoder 132, and an instruction such as "re-transmission" or "warning" is issued to the transmitting side S. Thus, for example, decoder 132 is provided with, for example, four bits (lines) of input lines and is capable of outputting in fifteen ways with binary digits as "1" and "0" inputted into each line. An output from any of upper five parts on the output side of the decoder is, for example, "normal", an output from any of middle five parts is "warning", and an output from any of lower five parts is "re-transmission". Thus, a performance "check" is effected. In this way, the operator at the transmitting location S can check the output transmitted to the receiving location.

However, complete agreement of the final value $\beta$ with the error to be allowed $\alpha$ is ideal only, and therefore the function will be fulfilled by setting a certain allowance and adapting the device to issue a "re-transmission" or "warning" instruction when the discrepancy between the two values exceeds the allowance.

Since this embodiment of the invention is adapted to compare an accumulation value of images on the manuscript obtained from ratio data and the picture element density with the accumulation value of output images, when abnormalities occur in the images on the paper, the abnormalities can be immediately detected to feedback the detection results to the transmitting side, thereby always obtaining output images of high quality.

Figure 3:
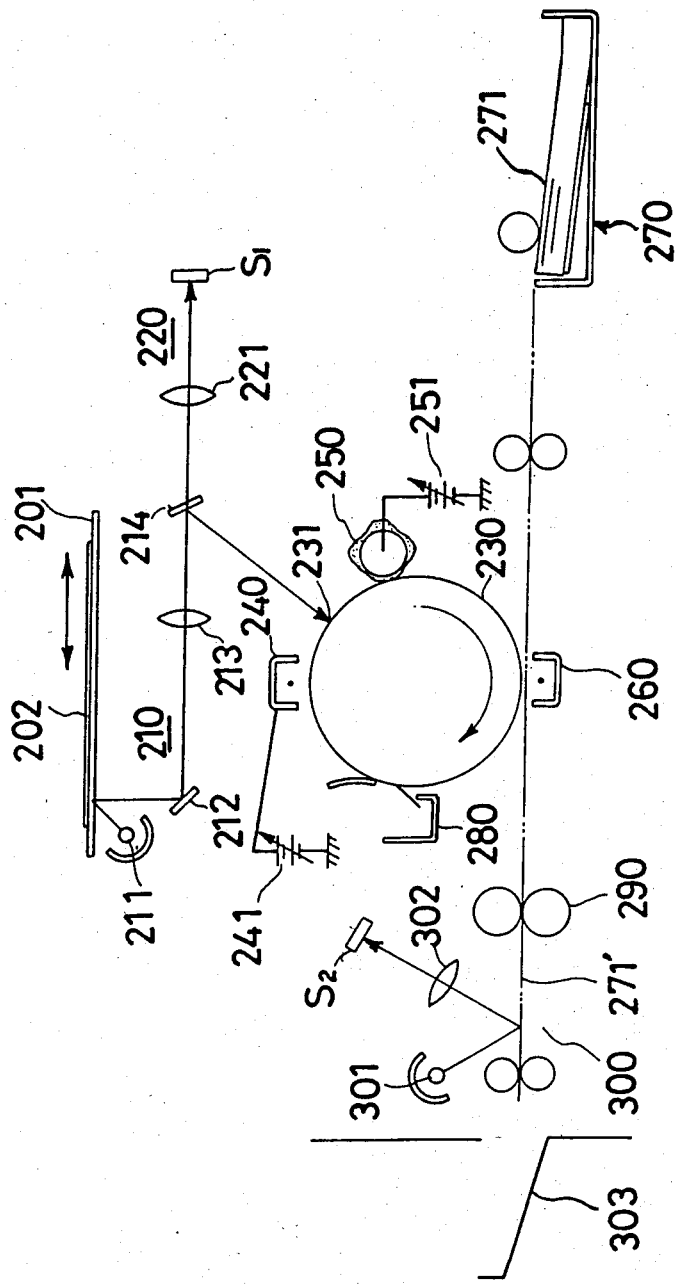
FIG. 3 is a schematic side view of a third embodiment of the invention.

Next, FIG. 3 is a side view of a third embodiment of the invention, in which an image output apparatus shown is an electrostatic photographic copying machine. Reference numeral 201 indicates a glass plate for moving a manuscript 202 in the horizontal direction as shown by the arrow. Numeral 210 indicates a light exposure optical system provided under the glass plate 201 and including a light source 211, a reflecting mirror 212, a lens 213, and a half-mirror 214, the structure thereof being such that a beam of light reflected by the half-mirror 214 reaches an exposure position 231 of a photoreceptor 230 to form electrostatic latent images thereon.

Numeral 220 indicates an optical system branching from the light exposure optical system 210 and including a lens 221 for imaging the light passing through half-mirror 214 and a first reading sensor $S_1$ disposed adjacent the imaging face of lens 221 and composed of, for example, a CCD as described above. First reading sensor $S_1$ senses, e.g. black image dots or picture elements of the images on the manuscript 202.

The photoreceptor 230 rotates in the direction indicated by the arrow, and a charging device 240 is provided on the upstream side of the exposure position 231, with a developing device 250 disposed on the downstream side thereof. Numerals 241 and 251 indicate an electric charging source and a bias power source, respectively. Numeral 260 represents a transfer device for transferring toner-applied images formed on the photoreceptor 230 onto a paper 271 when this paper fed from a paper feeding device 270 synchronously with the rotation of photoreceptor 230 reaches a transfer position. Numeral 280 indicates a cleaning device for scraping residual toner from the photoreceptor 230. Devices 240, 250, 260 and 280 are disposed around the photoreceptor 230. A fixing device 290 fixes toner-applied images transferred onto the paper by transfer device 260 and feeds the paper to a delivery device 300.

Adjacent paper delivery device 300 is a second reading sensor $S_2$, for example comprising a CCD (as described above) the same as first reading sensor $S_1$, for detecting image dots, for example black image dots or picture elements, of the printed image on paper 271'. Reference numeral 301 designates a light source, 302 designates a lens, and 303 designates a paper delivery tray.

Figure 4:
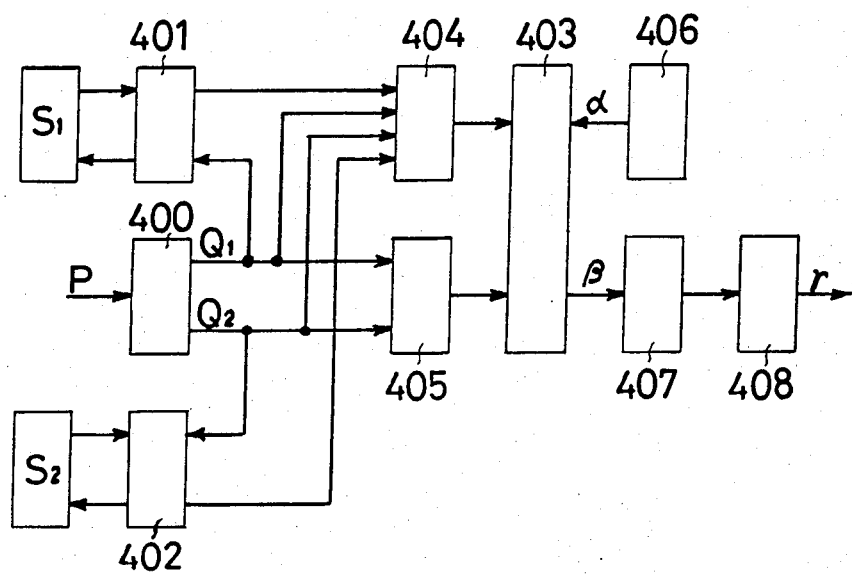
FIG. 4 is a block diagram of an example of a control circuit for the embodiment of FIG. 3.

FIG. 4 is a block diagram showing an example of the structure of a control circuit for the electrostatic photographic copying machine described above. Numeral 401 is a first driver to actuate first reading sensor $S_1$ and 402 is a second driver to actuate second reading sensor $S_2$, drivers 401 and 402 being controlled by a switching circuit 400 which transmits any of outputs $Q_1$ and $Q_2$ upon receipt of an extraneous timing signal P from, for example, a switch in the paper carrying system. Numeral 403 denotes a counter, for example, an up-down counter, in which switching control is performed for up-counting and down-counting by means of a clock switching circuit 404 and a mode switching circuit 405. Numeral 406 designates a presetting switch for setting an initial value in the counter 403, numerals 407 and 408 indicating a D/A converter and a buffer, respectively.

An operation conducted when the contents of a manuscript are input now will be described.

(1) A set value $\alpha$ is input into counter 403 by means of presetting switch 406. For example, such value is set at one million bits for copying a manuscript of A4 (JIS) size.

(2) Upon the start of exposure of the manuscript 202 to light after placement thereof on the glass plate 201, output $Q_1$ from the switching circuit 400 is turned to be "active" by the extraneous timing signal P, and first reading sensor $S_1$ is actuated by first driver 401. At the same time, clock switching circuit 404 and mode switching circuit 405 are turned to the up-counting mode by output $Q_1$.

(3) With the movement of the glass plate 201, reflected light from the manuscript 202 passes through the light exposure optical system 210 and forms electrostatic latent images on the exposure portion 231 of photoreceptor 230, and the light passing through the half-mirror 214 is input into first reading sensor $S_1$. The output from first reading sensor $S_1$ is a clock signal for up-counting and is input into the counter 403 which starts and continues up-counting from the set value $\alpha$ to the end of reading of the manuscript and maintains a counted value $(\alpha+\mu)$ ($\mu$: accumulation value of the number of dots or picture elements of images on the manuscript) to the final steps of operation. The electrostatic latent images are developed by the developing device 250 and transferred to the paper 271 by the transfer device 260. The imaged paper 271' is forwarded to the fixing device 290, carried to the paper delivery device 300 and output to the paper delivery tray 303.

(4) When the paper 271' reaches a predetermined position at the paper delivery device 300, output $Q_2$ from the switching circuit 400 is turned to be "active" by the extraneous timing signal P (output $Q_1$ returns to the initial state) and second reading sensor $S_2$ is actuated by second driver 402. At the same time, the clock switching circuit 404 and the mode switching circuit 405 are changed over to the down-counting mode by output $Q_2$.

(5) When the light reflected from the paper 271' is detected by and input into second reading sensor $S_2$, the read output from sensor $S_2$ is adapted to be a clock signal for downcounting and is input into counter 403 which starts and continues down-counting from the counted value $(\alpha+\mu)$ to the end of reading of the paper 271'.

(6) When such detecting or reading of the paper 271' is satisfactorily finished, the final value $\beta$ must be equal to the initial set value $\alpha$.

(7) If the final value $\beta$ is not equal to the set value $\alpha$, the D/A converter 407 applies D/A conversion to this final value $\beta$ and issues a control instruction $\gamma$ through the buffer 408. According to this control instruction $\gamma$, the bias voltage in the developing device 250, the charge voltage in the charging device 240, and/or the voltage in the light source are adjusted to minimize the difference between the final value $\beta$ and the set value $\alpha$, thereby adjusting quality to assure a satisfactory copy. However, complete agreement between the final value $\beta$ and the set value $\alpha$ is ideal only. Therefore, the function is fulfilled practically by setting an allowance and issuing a control instruction when the discrepancy between the two values exceeds such allowance.

In the above embodiment, an up-down counter is employed as the counter 403. However, respective separate counters for the first and the second reading sensors $S_1$ and $S_2$ may be provided for comparing the two values.

When using CCDS reading sensors, mean values of outputs therefrom are adopted as respective outputs. Therefore, threshold values for discriminating black color from white color preferably are set before-hand by drivers 401 and 402.

In the example described above, the first reading sensor is provided in optical system 220 branching from the light exposure optical system 210. However, a separate optical system may be provided exclusively for the first reading sensor $S_1$.

As described above, this embodiment is provided at an image output apparatus, such as an electrostatic photographic copying machine, with a manuscript reading sensor which reads the manuscript information so that an accumulation value of images of the manuscript obtained on the basis of such sensor is compared with an accumulation value of outputs from a reading sensor reading produced images of the manuscript, thereby to carry out image quality adjustment. Hence the image quality automatically can be checked and a copy of high quality always is obtainable.

Although the present invention has been described and illustrated with respect to preferred features thereof, it is to be understood that various changes and modifications may be made to the specifically described and illustrated features without departing from the scope of the present invention. Furthermore, although various of the specific elements of the structure of the illustrated embodiments have not been described in detail, such elements are intended to be formed by commercial structures capable of achieving the described functions, as readily will be understood by one skilled in the art.

We claim:

1. An image output apparatus for printing an image of an original document and for comparing such printed image with the original document, said apparatus comprising:

means for supplying information representative of the original document, said supplying means comprising means for generating signals in the form of coded print data of the original document;

a printing unit operable in response to said information from said supplying means for printing an image of the original document on a sheet of paper supplied from a paper feeding device;

image sensor means for sensing said image and for providing information representative thereof, said sensor means comprising means for generating output codes of said image; and means for comparing said information from said image sensor means with said information from said supplying means, said comparing means comprising comparator circuit means for comparing said coded print data with said output codes;

a switching means and a storage means, said switching means being operatively connected between said means for supplying information and said printing unit and controlled by said means for comparing, wherein when said means for comparing determines that said information from said image sensor means differs from said information from said supplying means, then said switching means transfers said information from said supplying means to said storage means instead of said printing unit.

2. An image output apparatus for printing an image of an original document and for comparing such printed image with the original document, said apparatus comprising:

means for supplying information representative of the original document, said supplying means comprising means for generating signals in the form of print data of the original document supplied to said printing unit and means for generating signals in the form of ratio data of the original document;

a printing unit operable in response to said information from said supplying means for printing an image of the original document on a sheet of paper supplied from a paper feeding device;

image sensor means for sensing said image and for providing information representative thereof, said sensor means comprising means for generating an output corresponding to said image; and means for comparing said information from said image sensor means with said information from said supplying means, said comparing means comprising means for calculating an accumulation value of said original document from said ratio data of said original document, means for calculating an accumulation value of said output, and means for comparing said accumulation values.

3. An image output apparatus for printing an image of an original document and for comparing such printed image with the original document, said apparatus comprising:

means for supplying information representative of the original document, said supplying means comprising a reading sensor for generating signals representative of said original document;

a printing unit operable in response to said information from said suppling means for printing an image of the original document on a sheet of paper supplied from a paper feeding device;

image sensor means for sensing said image and for providing information representative thereof, said sensor means comprising means for generating an output corresponding to said image; and means for comparing said information from said image sensor means with said information from said supplying means, said comparing means comprising means for calculating an accumulation value of said signals from said reading sensor, means for calculating an accumulation value of said output, and means for comparing said accumulation values which comprises a counting means for counting the difference between said two accumulation values.

* * * * *